July 21, 1964    J. B. McALPINE    3,141,390
LIFTING DEVICE
Filed Sept. 20, 1960    7 Sheets-Sheet 4

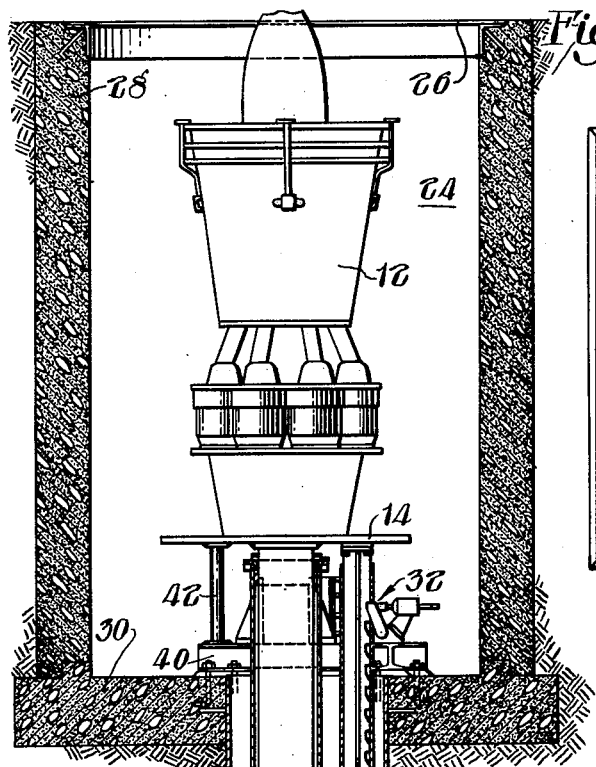
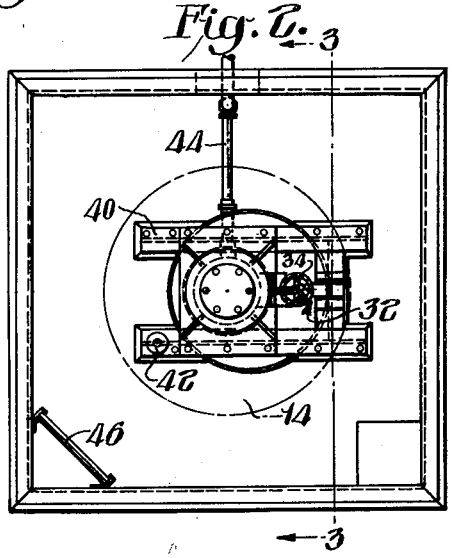
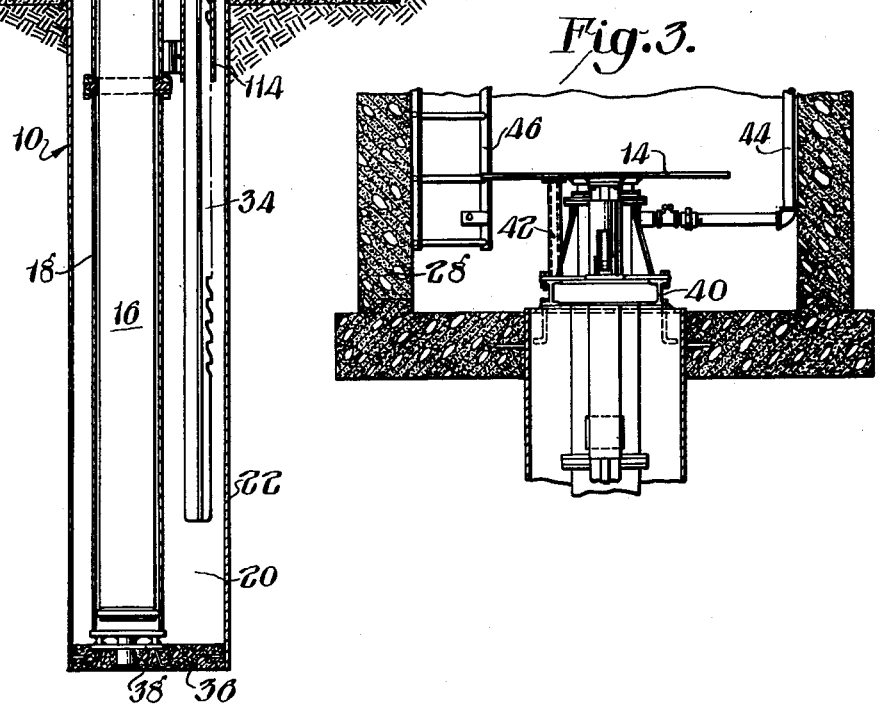

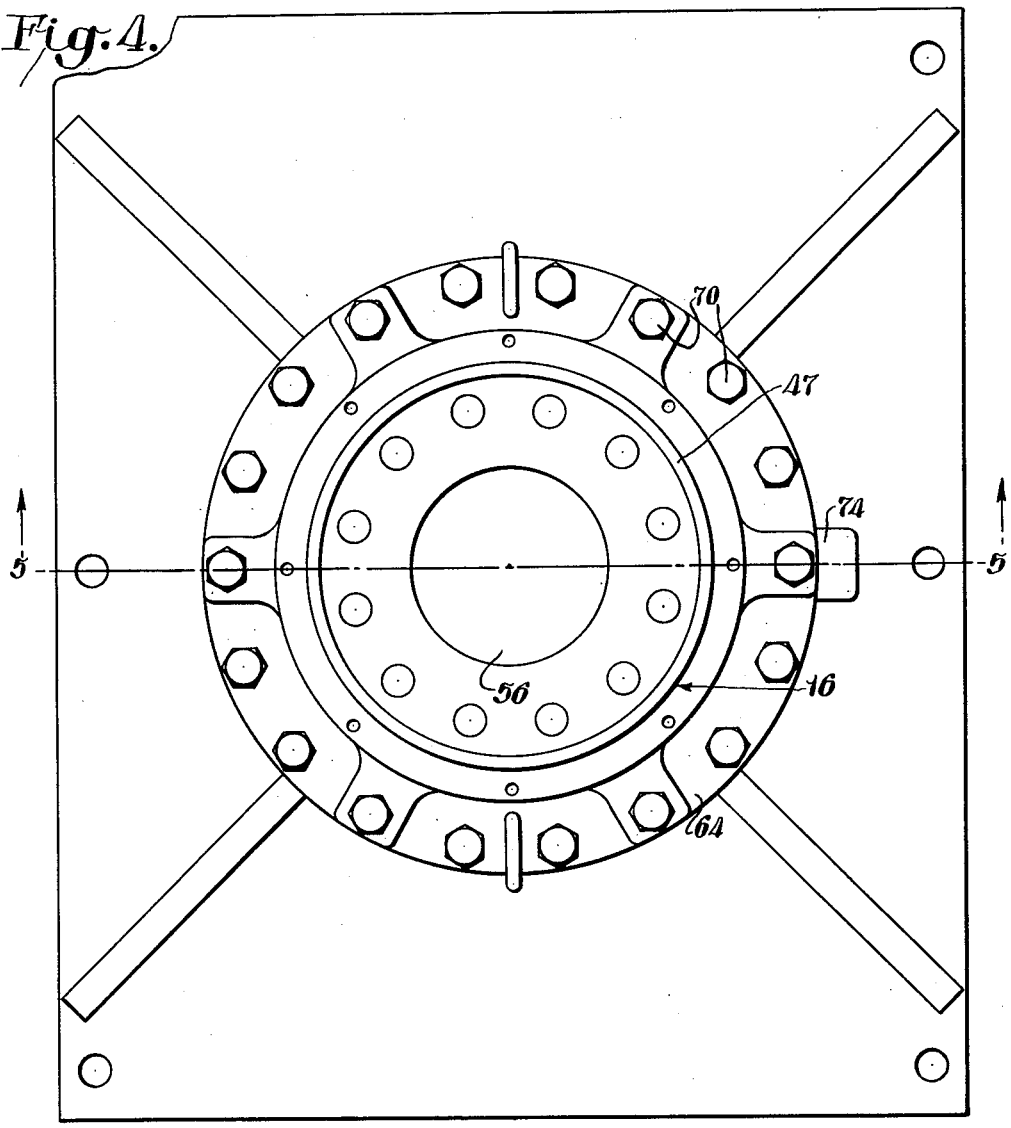
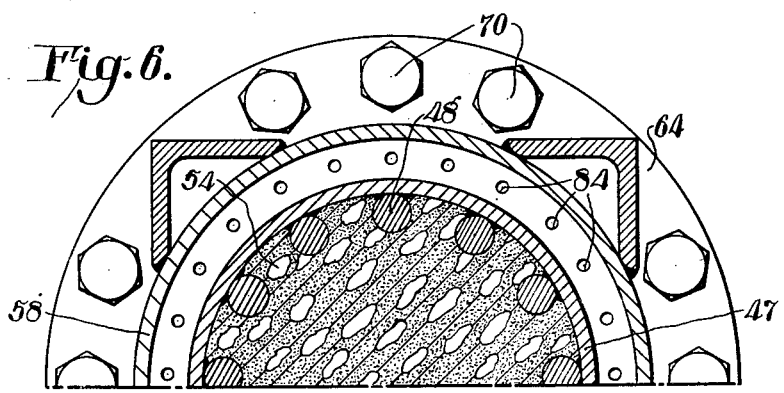

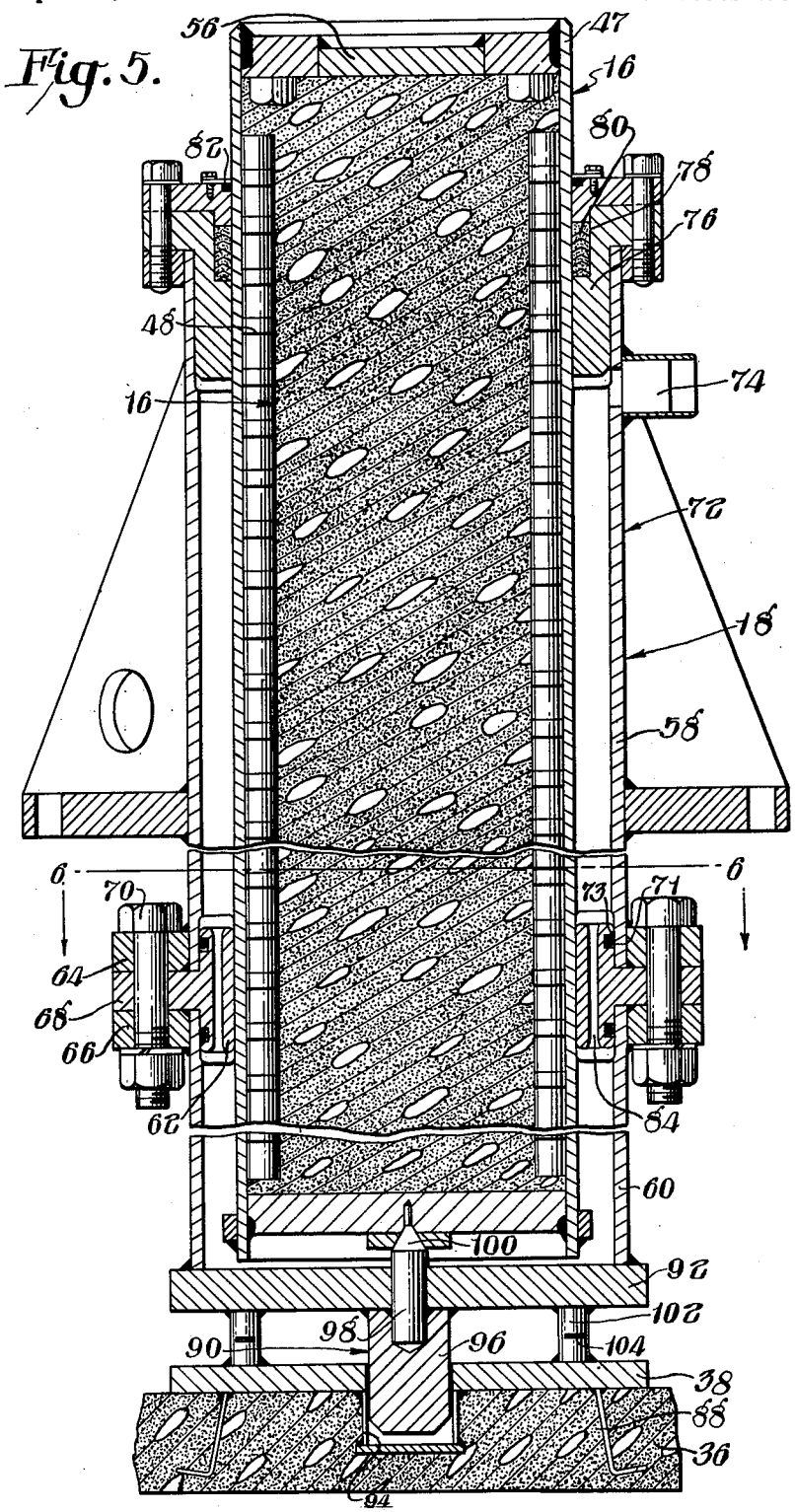

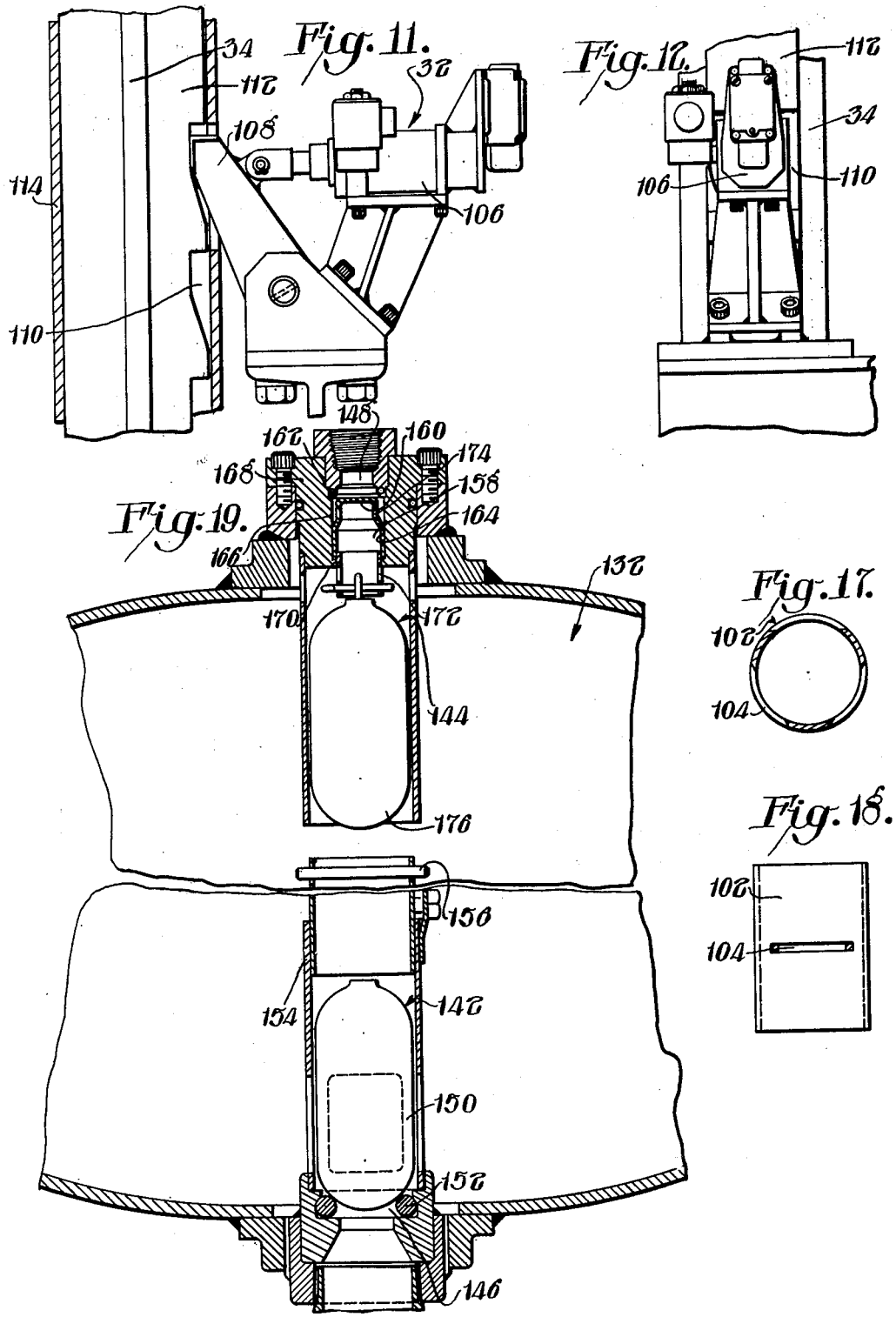

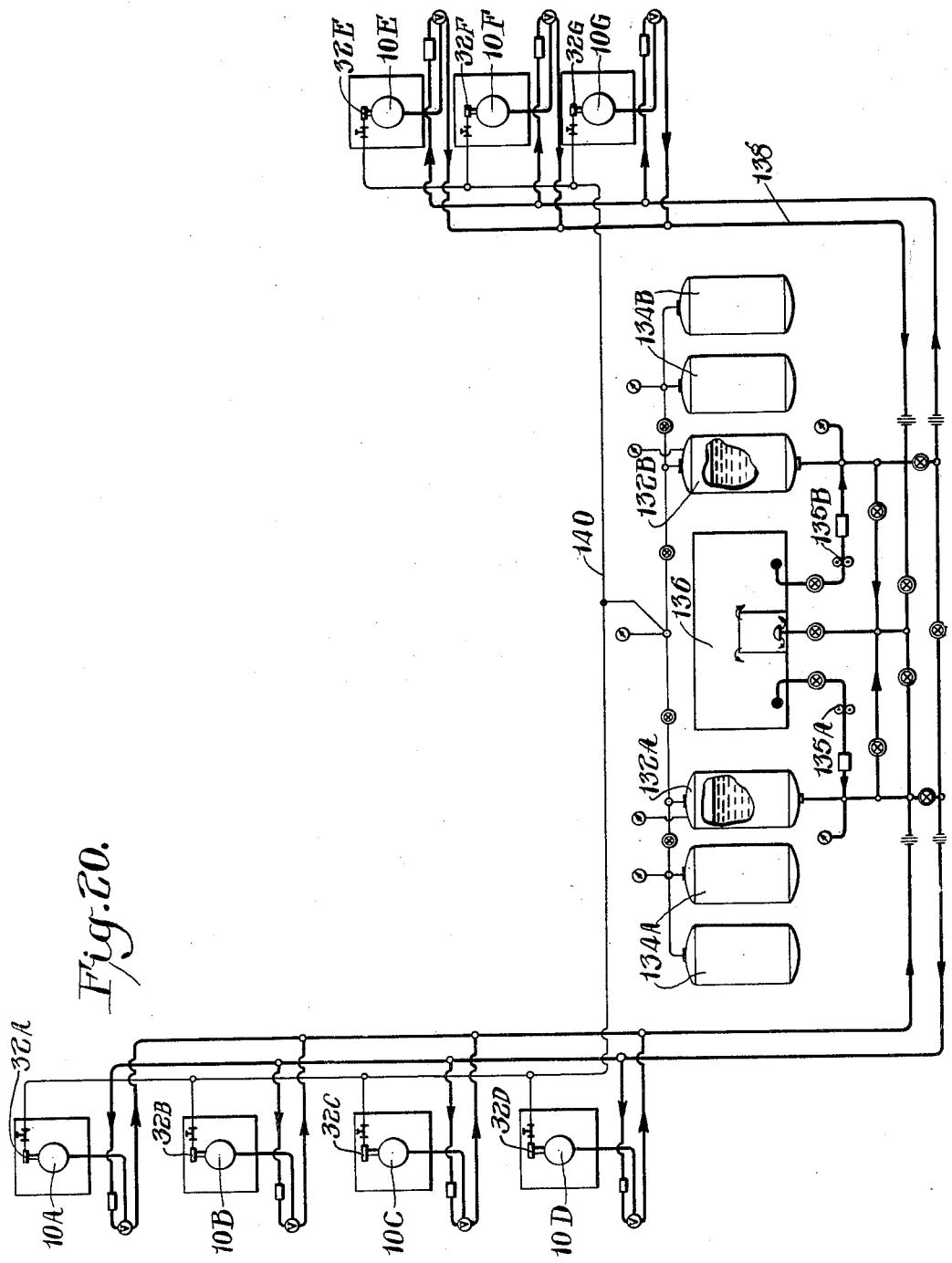

United States Patent Office 3,141,390
Patented July 21, 1964

3,141,390
LIFTING DEVICE
John B. McAlpine, Scarborough, Ontario, Canada, assignor to Symington Wayne Corporation, Salisbury, Md., a corporation of Maryland
Filed Sept. 20, 1960, Ser. No. 57,325
7 Claims. (Cl. 92—248)

This invention relates to a lifting device for carrying a relatively high load through a relatively long working stroke, and it more particularly relates to such a device which can raise and lower a long and heavy aircraft engine through a stroke substantially equal to its length to make it completely accessible from a given working level.

Modern aircraft engines, for example, of the pure jet type, are quite long and heavy, and it is difficult to obtain complete access to them when they are dismounted for maintenance. Ordinarily elaborate staging is used which must be assembled and disassembled. Proposals have, therefore, been made to raise and lower these engines upon a lifting platform mounted within a pit past workmen at ground level to make any part of the engine easily available without requiring precarious scaffolds or stages. However, jet engines are quite long and heavy which imposes a severe load upon a hydraulic lift. Furthermore, a single plunger is highly susceptible to damaging oscillation under load when it is extended in the range of six feet which offers quite a severe problem when a delicate and expensive mechanism, such as a jet engine, is being handled. Were expense of no importance, a suitable lift could be made by increasing the size of all the parts and using the strongest materials. However, this use of special materials and structural shapes would be prohibitively expensive.

An object of this invention is to provide a simple and economical lifting device which is capable of carrying relatively great loads through a relatively long working stroke with minimum oscillation characteristics.

Another object is to provide such a device which incorporates a plunger and cylinder which are simple and economical to manufacture, assemble, install and remove for maintenance.

Still another object is to provide such a plunger and cylinder which utilize commercially-available structural materials; and A further object is to provide such a device which is safe and positive in operation.

In accordance with this invention a remarkably strong plunger with minimum oscillation characteristics for a lifting device can be made from commercially-available structural materials by inserting a number of slender rods within an elongated tube, made for example of standard steel tubing, and welding the ends of these rods, which may be concrete reinforcing rods made of steel, to the ends of the inner wall of the casing to increase its tensional strength. The casing is then filled with a cementitious mixture such as concrete to make it remarkably strong in compression and resistant to oscillation.

A remarkably simple and conveniently assembled and disassembled cylinder for a lifting device incorporates a pair of longitudinally aligned tubular sections joined with an internal bearing ring held between them. The joinder between these sections is particularly conveniently accomplished by connecting a pair of flanges upon the tubular sections to a peripheral flange upon the bearing ring. Peripheral seals, such as O-rings, are utilized between the bearing and inner cylinder wall to have metal to metal contact between the flanges, insure alignment between the tubes upon assembly.

A highly convenient means for connecting the cylinder for such a lifting device to a foundation is provided by an auxiliary base plate which is aligned with the base of the cylinder by a sliding centering means and temporarily attached to it by breakable straps, which hold the parts together prior to securing the base plate to the concrete foundation. This facilitates withdrawal of the cylinder from the foundation structure whenever necessary.

An unusually simple and effective resilient pawl type of safety device, for preventing the platform from dropping in the absence of hydraulic pressure, is provided by a pneumatic piston and cylinder incorporating an annular piston whose force is transmitted to the pawl through a sleeve-contained compression spring. Furthermore, a positive acting high liquid level float-operated valve for an accumulator tank used with such a lifting device is provided by employing a restrictive passageway which builds up gas pressure within the accumulator tank immediately prior to closure to insure the provision of a positive valve-closing differential.

Novel features and advantages of the present invention will become apparent to one skilled in the art from a reading of the following description in conjunction with the accompanying drawings wherein similar reference characters refer to similar parts and in which:

FIG. 1 is a cross-sectional view in elevation of one embodiment of this invention carrying a jet engine;

FIG. 2 is a plan view of the embodiment shown in FIG. 1 with jet engine removed and lifting platform in phantom;

FIG. 3 is a cross-sectional view taken through FIG. 2 along the line 3—3;

FIG. 4 is a plan view of the cylinder and plunger assembly shown in FIG. 1;

FIG. 5 is a cross-sectional view taken through FIG. 4 along the line 5—5;

FIG. 6 is a cross-sectional view taken through FIG. 5 along the line 6—6;

Figure 7:
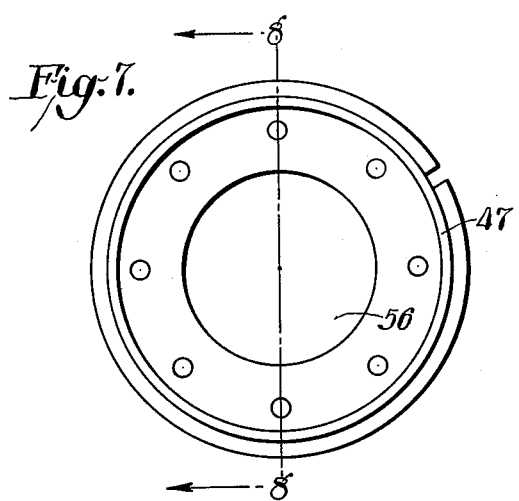
FIG. 7 is a plan view of the plunger shown in FIG. 8.
Figure 8:
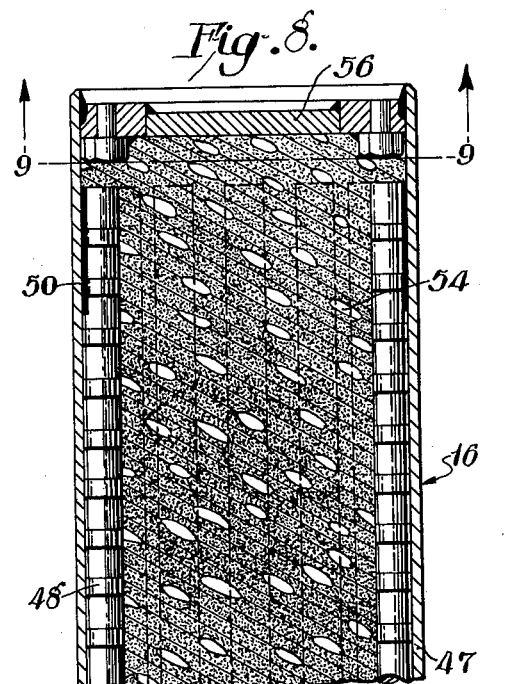
FIG. 8 is a cross-sectional view taken through FIG. 7 along the line 8—8.
Figure 10:
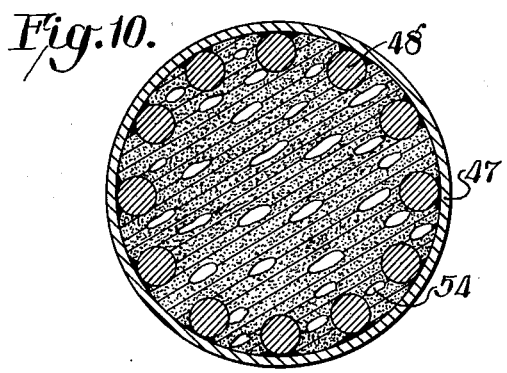
Figure 9:
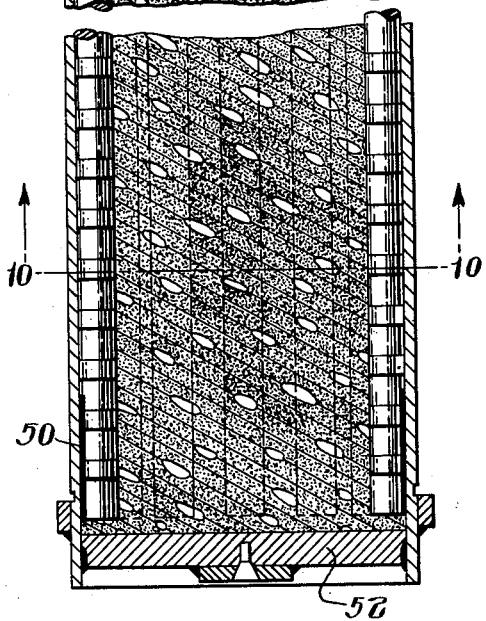
Figure 15:
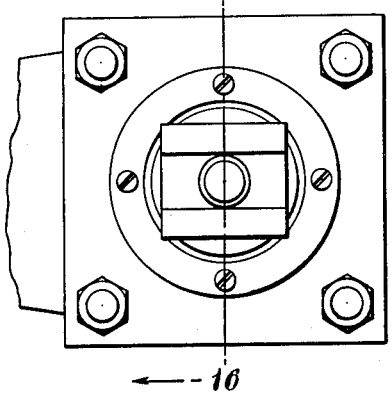
Figure 14:
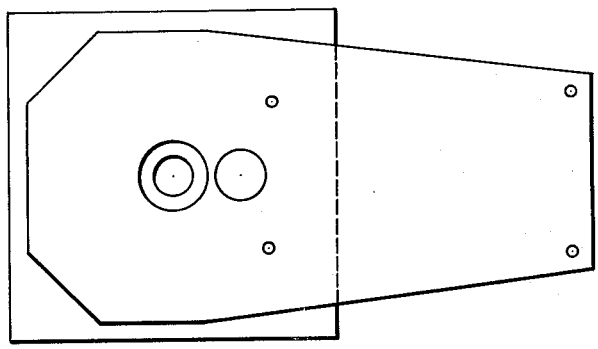
Figure 16:
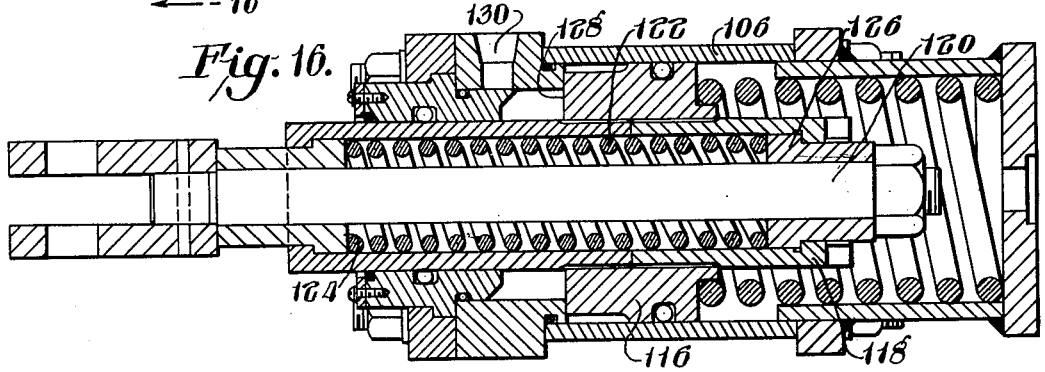
Figure 13:
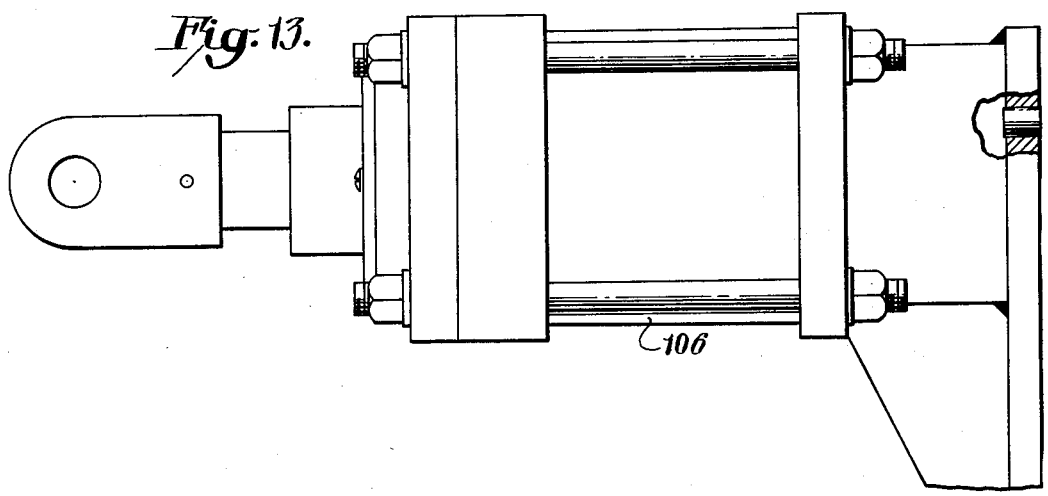

FIGS. 9 and 10 are cross-sectional views respectively taken through FIG. 8 along the lines 9—9 and 10—10;

FIG. 11 is a view in elevation partially broken away of a portion of the pawl and ratchet shown in FIG. 1;

FIG. 12 is a side view in elevation of the pawl and ratchet portion shown in FIG. 11;

FIG. 13 is an enlarged view of the portion of the pawl assembly shown in FIG. 11;

FIGS. 14 and 15 are respectively end views of the portion shown in FIG. 13;

FIG. 16 is a cross-sectional view taken through FIG. 15 along the line 16—16;

FIGS. 17 and 18 are enlarged views of portions of the attaching members shown at the bottom of FIG. 5;

FIG. 19 is a cross-sectional view of a high and low level valving arrangement for an accumulator tank associated with the hydraulic system shown in FIG. 20; and FIG. 20 is a schematic diagram of a hydraulic system for operating the lift shown in FIG. 1.

In FIGS. 1–3 is shown a hydraulic lift assembly 10 carrying a load such as a jet engine 12 upon a platform 14 which is raised and lowered by upward and downward movement of a plunger 16 within a cylinder 18. Cylinder 18 is accommodated within a well 20 enclosed within casing 22, which extends below pit 24. Pit 24 is long enough to receive substantially all of the length of jet engine 12 when platform 14 is completely lowered. The working stroke of plunger 16 is long enough to completely raise the platform to ground level 26 thereby permitting workmen standing there to work upon any selected portion of the engine. An auxiliary platform (not shown) is supported adjacent the top of rectangular pit 24 to enclose any opening existing between the engine and the side of pit 24 and permit workmen to stand as close as possible to engine 12 in working upon it. Furthermore, a securing means (not shown) connects the bottom of engine 12 to platform 14 to center and secure it during use. The walls 28 and floor 30 of rectangular pit 24 are made of poured concrete. Since the engine is approximately six feet long, a working stroke in that neighborhood will permit all portions of it to be raised to working or ground level 26. This imposes severe stresses upon the extended plunger 16 which are accommodated by its unique structure as later described in detail.

A pawl and ratchet arrangement 32, which operates upon a vertical strut 34 secured to the lower side of platform 14 parallel to plunger 16, prevents the platform from being lowered unless hydraulic pressure is available for supporting the plunger. This pawl and ratchet assembly is later described in detail.

In conjunction with FIGS. 11–16 the lower end of cylinder 18 is secured to concrete foundation 36 within casing 22 through an auxiliary base plate 38 which facilitates installation of the cylinder and its removal should this become necessary. This arrangement is later described in detail in conjunction with FIG. 5.

Outer casing 22 is supported from concrete floor 30 of pit 24 by attachment to a pair of structural beams 40 which help transmit loads to the strong foundation. A support rod 42 extends upwardly from one of beams 40 to help support platform 14 and any load imposed thereon when it is in the fully lowered position. Hydraulic pressure is provided to the space between plunger 16 and cylinder 18 through oil supply line 44, and air pressure is supplied to pneumatically-operated pawl and ratchet assembly 32 through an air supply line (not shown). A ladder 46 is provided within pit 24 to provide convenient access to the working parts within pit 24.

FIGS. 4–10 show details of plunger and cylinder assembly, and FIGS. 5, 6, 8 and 10 particularly describe details of the plunger 16 which is remarkably strong and resistant to oscillation despite its economical structure which utilizes commercially-available materials. Plunger 16 accordingly is made from a length of standard steel tubing 47, such as that utilized in welded steel piping; and a number of slender reinforcing rods 48 are secured within tube 18 by welds 50 shown in FIG. 8 adjacent the ends of rods 48. These rods, as shown in FIG. 8, are surface roughened; and, as indicated in FIG. 8, are of the standard concrete reinforcing type. One form of suitable concrete reinforcing rod is shown in FIG. 8, and other available types of such rod with different surface designs may also be conveniently utilized. Welds 50 adjacent the ends of the tube may be conveniently made through its open ends, and they provide sufficient tensile reinforcement of the tube wall despite their end attachment. These rods 48 as shown in FIG. 10 are regularly spaced around the inner wall of tube 47 to balance their reinforcing effect upon the tube wall.

After rods 48 are secured within tube 47, an end plate 52 is welded within the bottom of plunger 16; and the tube then filled with a cementitious mixture 54 such as concrete. The upper end of plunger 16 is then sealed by an upper end plate 56 which is also welded in place. The resultant plunger 16 is remarkably strong in both tension and compression and also remarkably resistant to oscillation both in preventing its initiation and damping any small vibrations that might occur. At a full extension of approximately five to six feet, a ten-inch diameter plunger is approximately four times as stiff as a normal hollow tube, and its deflection under a given load of the type described is reduced from approximately one inch to a remarkably slight 0.060 inch deflection. Furthermore, any deflection of this small extent that occurs is quickly damped. It is believed that the concrete filler prevents the slender rods from bowing under compressive stresses as well as providing a high degree of inherent resistance to compressive loads. However, the exact mechanism by which this structure is made so remarkably stiff and resistant to vibration is not completely understood because these properties exceed all expectations.

The remarkably convenient cylinder 18 of this invention is described in FIG. 5, and it includes longitudinally aligned upper elongated tube 58 and lower elongated tube 60 which are joined together with an internal bearing ring 62 held between them. A dependable accurate metal to metal joint is provided between tubes 58 and 60 and bearing 62 by securing upper and lower flanges 64 and 66 to the top and bottom of peripheral flange 68 of bearing 62 by nuts and bolts 70. Oil leakage is prevented through this joint by O-ring seals 71 disposed within suitable sealing recesses 73 peripherally arranged about the outer surface or bearings 62.

This split arrangement for cylinder casing 18 provides several advantages in a structure incorporating a separate internal bearing. One advantage is its ease of disassembly for repair of the bearing; and another is the fact that upper section 72 may be made and stocked in standard lengths with the operative stroke being adjusted for any particular installation by varying the length of lower tube 60.

The standardized upper section 72 of the cylinder also includes other functional portions such as an oil inlet 74, an upper bearing 76, and a packing gland 78 incorporating, for example, chevron packing 80. A standard wiper ring 82 is also disposed at the top of upper cylinder portion 72. Longitudinal passageways 84 are provided through bearings 62 to permit oil to flow to the lower portion of plunger 16 when it is supplied through inlet pipe 74.

Another advantage of this invention is the higly convenient means which it provides for anchoring the bottom of cylinder 18 to a foundation. Ordinarily the bottom of the cylinder itself is embedded in concrete. However, this prevents the cylinder from being readily detached from the foundation for maintenance or complete removal. Many cylinders have, therefore, been abandoned rather than incurring the expense of difficult removal from the concrete in which they are embedded.

In accordance with this invention an auxiliary base plate 38 is provided for embedment within concrete foundation 36. It accordingly includes bent legs 88 which are permanently embedded within the concrete. A sliding centering means 90 connecting bottom plate 92 of cylinder 18 and auxiliary plate 38 is provided. Sliding centering means 90 includes a recessed pocket 94 extending downwardly from the center of plate 38 and a central boss 96 extending from the center of bottom cylinder plate 92 which is inserted to slide within pocket 94. An upwardly extending pin 98 extends also through the center of bottom cylinder plate 92 and engages a tapered recess 100 in the bottom of plunger 16 to center it during shipping and installation.

Auxiliary plate 38 is attached to bottom cylinder plate 92 during shipping and installation by a set of straps or tubes 102 which are weak enough to collapse when the full weight of the cylinder is applied to them. These tubes are accordingly cut by slots 104 as shown in FIGS. 17 and 18 to facilitate their breakage upon movement of the cylinder in either longitudinal direction. It is also possible to elongate pocket 94 to completely receive boss 96 and support the full weight of plunger and cylinder assembly upon auxiliary plate 38 and foundation 36 instead of imposing this weight upon the end of boss 96.

In FIGS. 11–16 are shown details of pawl and ratchet assembly 32 which permits the lift to be lowered only when sufficient oil pressure is present to support the lift. This feature is provided by a resilient connection between operating piston and cylinder assembly 106 and pawl 108 which engages ratchet grooves 110 in the side of beam or strut 34. Strut 34 is, for example, a beam fabricated from a standard structural T to which a longitudinal bar 112 of relatively thicker cross-section is welded. Resiliently-engaged pawls are not broadly unique. However, the structure of strut 34 mounted within tube 114, which is connected to the lift foundation within outer casing 22 is unexpectedly dependable and economical; and the structures of pneumatic piston and cylinder assembly 106 are quite unique and effective.

As shown in FIGS. 13–16, pneumatic piston and cylinder assembly 106 includes an annular piston 116 which is secured to a sleeve 118 passing axially through it. Sleeve 118 reacts against internal shaft 120 in a direction to withdraw pawl 108 through compression spring 122 which is mounted between rear end wall 124 of sleeve 118 and the opposite enlarged end 126 of shaft 120. When air is supplied to face 128 of annular piston 116 through passageway 130, spring 122 is stiff enough to draw shaft 120 away from strut 34 only when the frictional resistance of strut 34 has been obviated by lifting strut 34 off pawl 108. This prevents disengagement of the safety pawl unless sufficient oil pressure is available for maintaining plunger 16 supported upon a pad of oil.

The hydraulic pumping arrangement for operating this invention is shown in FIG. 20, and FIG. 19 describes a particularly effective high and low level oil control for the accumulator tanks 132A and B to which supplemental air tanks 134A and B are respectively connected as shown in FIG. 20. Accumulator tanks 132A and B are sufficiently large to contain all of the oil in the portion of the system to which each are connected. As shown in FIG. 20, accumulator tank 132A is connected to operate four hydraulic lifts 10A, 10B, 10C and 10D of the type described, and accumulator tank 132B is connected to three hydraulic lifts 10E, 10F and 10G of the type described. The use of these accumulators permits a relatively small capacity pumping system incorporating pumps 134A and B to operate any of the lifts at sufficient speed because it is not necessary to operate them all at the same time, and they have quite substantial inactive periods. Pumps 135A and B draw from oil reservoir 136 and discharge into accumulators 132A and B through the piping systems described. The accumulators in turn feed hydraulic lifts 10A–G as indicated through pipe lines 138, and an air line 140, for example, carrying 90 p.s.i., supplies pawl and ratchet assembly 32A–G.

In FIG. 19 is shown a low level control valve 142 and a high level control valve 144 which are, for example, of the float-operated type for respectively preventing the oil level from dropping or rising through lower valve passageway 146 and upper valve passageway 148.

Lower valve 142 is not particularly unique, and it incorporates float-operated element 150 which engages an O-ring seat 152 to close valve 142. Float 150 is loosely contained within a slotted tube 154 by pin 156 at its upper end. The potential pressure of the oil that remains above valve 142 when it shuts off provides a sufficient differential to securely seal the valve upon contact of float 150 with O-ring seat 152. However, there is no such potential pressure available at upper valve 144, and a highly unique means is accordingly utilized for providing sufficient differential pressure to seal valve 144. This unique arrangement employs a flow-restricting pilot valve 158 which becomes operative immediately prior to engagement of sealing surface 160 with O-ring seat 162 of high level valve 144. This pilot valve 158 includes a hollow capped sleeve 164 which slides up and down within a cylindrical cavity 166 in upper valve block 168 within which it is secured by the inwardly extending shoulder 170 of the lower end of block 168. Ports 172 pass through the lower end of the skirt or hollow cap 164, and ports 174 perforate the reduced diameter upper end just below sealing surface 160. Lower ports 172 are closed by the sides of block 168 when pilot valve 158 starts to rise to restrict the outflow of air through valve passageway 148 when upper float 176 starts to rise. This prevents the air in the upper portion of accumulator 132 from discharging fast enough to storage tanks 134 to equalize the pressure on both sides of valve 144. When the pressure-operated switch (not shown) shuts off the connected oil pump 135 upon rise of pressure in accumulator 132 to a predetermined maximum limit, the pressure within the accumulator builds up to a sufficient differential with respect to that in storage tanks 134 to quickly and securely slam valve 144 shut. The high pressure built up within tank 132 then insures that pump 135 shuts off when the high level limit is reached. An effective pumping range, for example, starts the pump at 150 p.s.i. and shuts it off at 200 p.s.i., and the described type of valve maintains shut off pressures within the tank as high as 250 p.s.i. to insure positive pump shut off when the pump pressure approaches a pressure of 200 p.s.i.

*Operation*

Platform 14 is raised to working level 26 by hydraulic pressure applied to plunger 16 within cylinder 18. An engine 12 can then be positioned on its end as shown in FIG. 1 upon platform 14 which can then be lowered to any position including the fully lowered position shown in FIG. 1. This permits mechanics at ground level 26 to reach any part of engine 12 to work upon it. These mechanics stand upon a removable annular structure (not shown) which is installed about engine 12 from ground level 26 to permit them to stand as close as possible to the engine.

As previously mentioned, the remarkably stiff and stable unique structure of plunger 16 prevents it from oscillating more than 1/16 inch even when fully extended. Furthermore, any such vibrations are quickly damped by the plunger. These characteristics provide optimum strength and rigidity of the working platform, which the delicate and expensive nature of a jet engine requires.

The structure of cylinder 18 as described in FIGS. 4 and 5 facilitates its assembly, disassembly, installation and removal as well as making it possible to utilize a removable bearing 62. Furthermore, this readily assembled and disassembled structure facilitates the stocking of standard upper cylinder portions 72 with the overall plunger stroke for each installation being adjusted by varying the length of lower tube 60.

Withdrawal of cylinder 18 from well 20 is facilitated by permanently attaching only auxiliary base plate 38 to concrete foundation 36 and providing a sliding connection between cylinder 18 and base plate 38 by the insertion of boss 96 within pocket 94. Breakable straps or tubes 102 are just strong enough to hold the parts together during installation to insure proper alignment.

Once the installation is completed, unique pawl and ratchet assembly 32 provides a simple and economical form of resilient pawl mechanism for preventing platform 14 from being lowered unless it is supported upon hydraulic pressure. This unique structure includes an annular piston 116 secured to an internal sleeve 118 which reacts upon pawl-operating shaft 120 through a compression spring 122 reacting between them. The highly flexible hydraulic system shown in FIG. 20 permits an array of seven lifts 10A–G to be operated by the pumps 135A and B in conjunction with accumulator tanks 132A and B and storage tanks 134A and B. This pressure system is connected to lifts 10A–G through pipelines 138, and air line 140 operates pawl and ratchet assemblies 32 A–G. The unique high level shutoff valve 144 described in FIG. 19 creates a high differential pressure between the air in the top of accumulator 132 and that in storage tanks 134 by restricting the outflow from accumulator 132 immediately prior to shutoff. This insures that sufficient pressure is trapped within accumulator 132 to slam valve 144 closed and maintain the pressure shutoff switch for pumps 135 actuated. Low level oil control valve 142 also prevents any air from discharging into pressure piping system 138.

What is claimed is:

1. A plunger comprising an elongated tubular casing, a number of slender rods of a material having a substantially high tensile strength inserted within said casing and extending longitudinally within it along its inner wall, securing means joining the ends of said rods to said inner wall adjacent the ends of said tubular casing to increase its tensile strength, and a cementitious mixture substantially filling the interior of said casing for preventing said rods from buckling and minimizing the tendency of said plunger to oscillate as well as increasing the compressive strength of said plunger.

2. A plunger as set forth in claim 1 wherein said tubular casing is made of steel tubing and said rods are also made of steel.

3. A plunger as set forth in claim 2 wherein said rods are surface roughened to help said cementitious mixture adhere to it.

4. A plunger as set forth in claim 3 wherein said rods are of the concrete reinforcing type.

5. A plunger as set forth in claim 1 wherein said cementitious mixture is concrete.

6. A plunger as set forth in claim 1 wherein said rods are spaced within said wall at equal intervals.

7. A plunger as set forth in claim 1 wherein said ends of said rods are joined to said wall by welding.

References Cited in the file of this patent

UNITED STATES PATENTS

| | | |
|---|---|---|
| 870,696 | Steffer | Nov. 12, 1907 |
| 1,234,893 | Lindley | July 31, 1917 |
| 1,548,559 | Simpson | Aug. 4, 1925 |
| 1,750,597 | McAlister | Mar. 11, 1930 |
| 2,039,858 | Vetorino | May 5, 1936 |
| 2,625,352 | Sykes et al. | Jan. 13, 1953 |
| 2,684,659 | Ackerman | July 27, 1954 |
| 2,690,939 | Whaley | Oct. 5, 1954 |
| 2,692,584 | Armington et al. | Oct. 26, 1954 |
| 2,780,504 | Russell | Feb. 5, 1957 |
| 2,794,425 | Tyler | June 4, 1957 |
| 2,798,778 | Flick | July 9, 1957 |
| 2,855,899 | Beatty | Oct. 14, 1958 |
| 2,884,946 | Anderson | May 5, 1959 |
| 2,888,944 | Breeback | June 2, 1959 |
| 2,918,337 | Kapitula | Dec. 22, 1959 |
| 2,935,049 | Krenning | May 3, 1960 |